Oct. 11, 1960     S. A. TOMKOWIAK     2,955,749
RECIPROCABLE PISTON GAS COMPRESSOR
Filed June 29, 1959
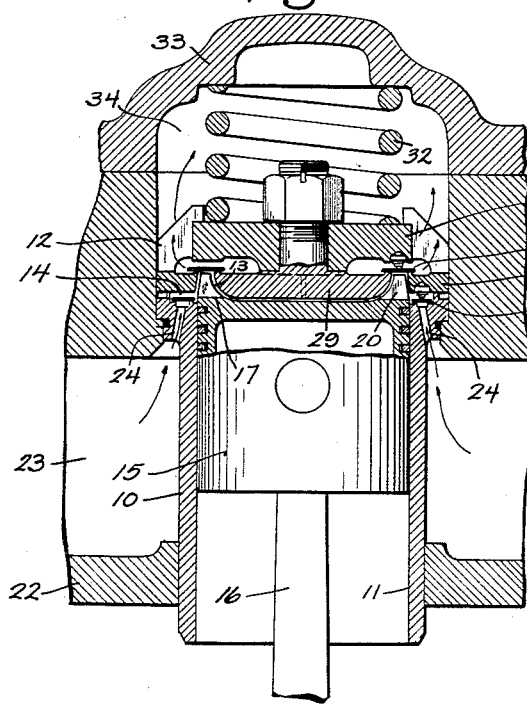
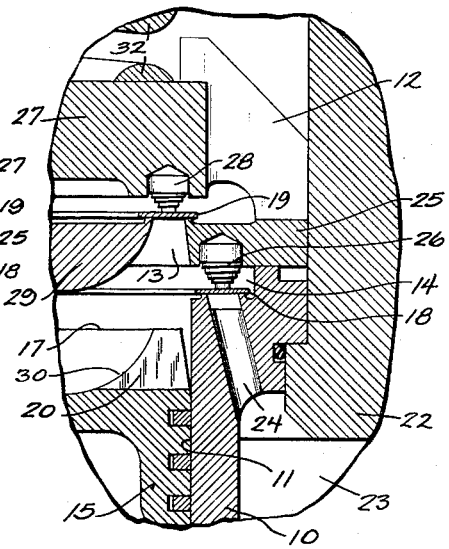
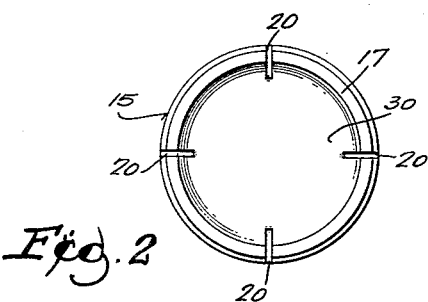
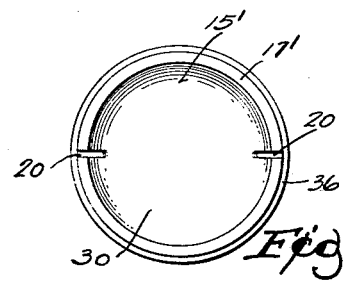
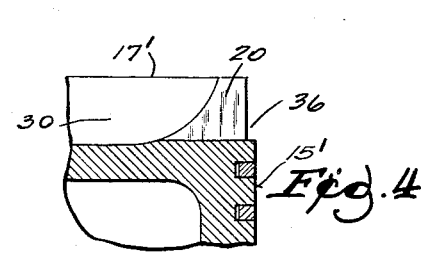
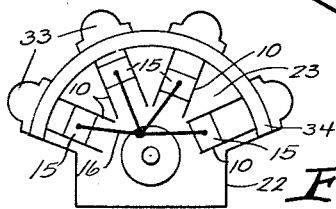
INVENTOR.
S. A. Tomkowiak
BY
Lieber, Lieber & Nilles

United States Patent Office 2,955,749
Patented Oct. 11, 1960

2,955,749
RECIPROCABLE PISTON GAS COMPRESSOR

Sylvester A. Tomkowiak, Milwaukee, Wis., assignor to The Vilter Manufacturing Co., Milwaukee, Wis., a corporation of Wisconsin Filed June 29, 1959, Ser. No. 823,714

6 Claims. (Cl. 230—172)

The present invention relates generally to improvements in the art of gas compression, and it relates more specifically to improvements in the construction and operation of gas compressors of the reciprocating piston type.

The primary object of the invention is to provide an improved reciprocable piston gas or air compressor assemblage in which the various parts are effectively protected against damage due to accumulation and entrapment of liquid within the final compression zone of the cylinder.

It is common practice in the refrigeration industry to utilize reciprocating piston type gas compressors having one or more compression stages for the gaseous refrigerant, each comprising a cylinder having an outwardly extending annular gas inlet gap near its discharge end within which an annular spring loaded suction valve is confined and also having an end closure head coacting with the cylinder bore to provide an annular compressed gas delivery space adjacent to the gap communicating with an adjacent annular spring loaded discharge valve, and a piston reciprocable within the cylinder bore and having a cup-shaped end provided with an annular flange movable into and substantially filling the annular delivery space whenever the piston reaches the end of its compression stroke.

While this type of compressor functions in a satisfactory manner when the gas is dry and free from liquid, it frequently happens that condensed volatile refrigerant or lubricating oil enter the piston displacement chamber and accumulate especially during periods of idleness of such compressors, and when the machine is subsequently operated the piston violently delivers the accumulated liquid against the relatively frail annular discharge valve with sufficient impact to crack or break this valve. When this occurs, the cracked valve allows the high pressure gas to blow back and to create heat sufficient to cause the piston, rings and cylinder to jam, and in the case of valve breakage fragments of the broken valve fall into the cylinder and cause the reciprocating piston to score the cylinder bore and to even damage the end head and the piston propelling connecting rod, thus necessitating costly repairs and loss of service.

It is therefore an important object of the present invention to provide simple but highly efficient instrumentalities for automatically and positively eliminating danger of having such liquid accumulations incur damage in air or gas compressors of this type.

Another important object of the invention is to provide one or more relatively restricted conduits adapted to conduct accumulated liquid from within the limited clearance space of a cupped piston gas compressor into the inlet valve confining gap of such a machine so as to prevent the piston from damaging parts when it reaches the end of its compression stroke.

A further important object of this invention is to provide effective accumulated liquid release means for a reciprocable piston gas compressor, which can be readily applied to new or existing compressors without materially affecting the operating efficiency of such units.

These and other more specific objects and advantages of the invention will be apparent from the following description.

A clear conception of the features constituting the present improvement, and of the construction and operation of several modifications of the invention applicable to commercial reciprocable piston air or gas compressors, may be had by referring to the drawing accompanying and forming a part of this specification in which like reference characters designate the same or similar parts in the various views.

Fig. 1 is a fragmentary central vertical section through the cylinder and a portion of the piston assemblage of a typical gaseous refrigerant compressor embodying liquid escape slots in the cup flange of the piston;

Fig. 2 is a top view of the piston involved in the assemblage of Fig. 1, showing four liquid escape slots formed therein;

Fig. 3 is an enlarged fragment of the assemblage shown in Fig. 1, more clearly depicting the details of construction;

Fig. 4 is a similarly enlarged fragmentary section of a modified piston structure also embodying the invention;

Fig. 5 is a top view of the piston illustrated in Fig. 4, drawn to reduced scale and having only two liquid escape slots therein;

Fig. 6 is an enlarged fragmentray section of a further modified piston structure embodying liquid escape ports instead of slots; and Fig. 7 is a diagram showing a typical arrangement of a group of the improved cylinder and piston assemblages embodying the invention in a gas compressing unit.

While the invention has been shown and described herein as being advantageously applicable to reciprocable piston compressors for refrigerant gases, it is not intended to confine the improvement to such usage; and it is also contemplated that specific descriptive terms employed herein be given the broadest possible interpretation consistent with the disclosure.

Referring especially to Figs. 1, 2 and 3 of the drawing, the compressor shown therein comprises in general a cylinder 10 having a bore 11 and a composite end closure head 12 cooperating with the cylinder to form an annular space 13 projecting axially away from the cylinder interior and also having an annular gap 14 extending outwardly away from the space 13; a piston 15 reciprocable within the cylinder bore 11 by means of a connecting rod 16 operated by the usual crank or eccentric and having an annular end flange 17 movable into and formed to substantially fill the space 13 during compression strokes of the piston 15; an annular spring-loaded suction valve 18 confined within the cylinder gap 14; an annular spring-loaded discharge valve 19 coacting with the head 12 adjacent to the space 13; and restricted conduit means in the form of several narrow open slots 20 extending radially through the piston flange 17.

The cylinder 10 may be mounted in a frame 22 having therein a gas supply passage 23 which is connected with the annular gap 14 by inlet ports 24, and the composite end closure head comprises an annular reaction plate 25 for the local springs 26 which coact with the suction valve 18, a cylindrical reaction plate 27 for the local springs 28 which coact with the discharge valve 19, and a member 29 secured centrally to the reaction plate 27 and forming an externally cup-shaped projection directed toward the cylinder interior as shown in Figs. 1 and 3. The central bore of the annular plate 25 is tapered and cooperates with the periphery of the member 29 to form the annular space 13, and the annular flange 17 provides a similarly cup-shaped central recess 30 in the end of the piston 15 adapted to coact with the external cup-shaped surface of the member 29 with minimum clearance, as illustrated in Fig. 1.

The entire cylinder end closure head 12 consisting of the plates 25, 27 and the member 29 is normally held in engagement with an abutment surface at the adjacent end of the cylinder 10 by a relatively heavy coil spring 32 coacting with the plate 27 and which reacts against a cap 33 firmly secured to the frame 22, and the chamber 34 surrounding this spring 32 communicates with the cylinder or compressor discharge conduit in a well known manner. The annular suction and discharge valves 18, 19 are flat and ordinarily formed of durable sheet-metal, and the annular space 13 constitutes a discharge passage for the compressed gases. The restricted slots 20 which are formed in the piston flange constitute an important feature of the present invention and may be of any desired number preferably spaced equi-distant about the axis of the cylinder, being adapted to connect the interior of the cup-shaped recess 30 in the end of the piston 15 with the annular suction valve confining gap 14 whenever the piston reaches the end of its compression stroke.

These cylinder and piston assemblages may be utilized singly or in diverse group arrangements such as illustrated in Fig. 7, wherein the several assemblages may either be operated as independent compressors or as successive stages of a single compressor unit. In any event, when such assemblages are operating normally, the piston 15 will reciprocate and will draw gas from the supply passage 23 past the suction valve 18 and through the gap 14 into the cylinder interior while receding from the end head 12, and will thereafter compress and deliver the gas through the annular space 13 and past the discharge valve 19 into the compression chamber 34. As a rule there will be little or no accumulation of liquid within the cylinder 15 between its end recess 30 and the end closure head 12 during such normal operation and the discharge valve 19 will not be subjected to undue shock or impact.

However, when such a cylinder and piston assemblage is permitted to remain at rest for a period of time, as is frequently the case in refrigeration installations, then considerable liquid such as lubricating oil, condensate from gases, and perhaps also water from cooling jackets, often accumulates in these cylinders 10 and especially in the lowermost end cylinders of a group such as shown in Fig. 7. If no means are provided for permitting escape of such liquid accumulations and because of the slight clearance space required between the piston 15 and head member 29 in order to maintain maximum efficiency, the piston will project the entrapped slugs of accumulated incompressible liquid against the relatively frail discharge valve 19 with sufficient impact to crack or burst this valve. Such destruction of the valves cannot occur with the present improvement since the conduit means or slots 20 in the piston flange 17 function to quickly and automatically permit the bulk of such liquid accumulations to escape by drainage into the relatively extensive annular gap 14 while any excess beyond the capacity of this gap will pass the valve 19 without seriously damaging the latter.

As previously indicated, the slots 20 should be sufficiently narrow and of limited number in order not to materially reduce the efficiency of the compressor, and as a further safeguard against the possibility of having fragments of broken valves 19 fall into the piston displacement chambers and score the cylinders, in cases of extreme liquid accumulations, the piston 15' and its flange 17' may be modified to provide an extra liquid cavity space 36 surrounding this flange as in Figs. 4 and 5. In the additional modification shown in Fig. 6, the escape conduit may be formed as drilled holes 20" formed in the end flange 17 of the piston 15", and if these various embodiments of the invention are not ample to meet all possible conditions of liquid accumulation, then the spring 32 will function to permit the entire end closure head assembly 12 to move bodily away from the compression zone of the compressor.

From the foregoing detailed description of the construction and functioning of the improved compressor assemblage it will be apparent that the invention in fact provides simple and highly effective means for protecting delicate parts of such units against possible breakage and damage resulting from such breakage. While the cost of the annular sheet-metal plate valves is not excessive, the damage to scored cylinders and pistons, resulting from having broken valve fragments wedged within the cylinder bores 11 can be very serious and expensive, and such possible damage is eliminated with the aid of the present improvement without materially affecting the compressor efficiency. The liquid escape conduits can be readily applied to either new or existing compressors embodying cup pistons 15, and no other alteration of such machines is required. The invention has proven highly satisfactory and successful in actual use, and serves to avoid necessity of constant attention while the compressors are intermittently operated.

It should be understood that it is not desired to limit this invention to the exact details of construction and operation of the refrigerant gas compressor herein specifically shown and described, for various modifications within the scope of the appended claims may occur to persons skilled in the art.

I claim:

1. In a gas compressor, a cylinder having a bore and an end closure head cooperating with the cylinder to form an annular space projecting axially away from the cylinder interior and also having an annular gap extending outwardly away from said space, a piston reciprocable within said bore and having an annular end flange movable into and substantially filling said space during compression strokes of the piston, a suction valve communicable with the cylinder bore through said gap, a discharge valve communicable with said bore through said space, and conduit means formed to connect said gap with the cylinder interior through said piston flange whenever the piston approaches the end of a compression stroke.

2. In a compressor, a cylinder having a bore and an end closure head cooperating with the cylinder to form an annular space projecting coaxially away from the bore and also having an annular gap extending outwardly away from said space, a piston reciprocable within said bore and having an annular end flange movable into and substantially filling said space and closing said gap during compression strokes of said piston, an annular suction valve confined within said gap, an annular discharge valve cooperable with said end head at the end of said space farthest from the cylinder interior, and restricted conduit means formed in said piston flange and being operable to connect said gap with the cylinder interior whenever the piston reaches the end of a compression stroke.

3. In a gas compressor, a cylinder having a bore and an end closure head provided with an external cup-shaped surface cooperating with the cylinder to form an annular space projecting away from the cylinder interior and also having an annular gap extending outwardly away from said space, a piston reciprocable within said bore and having a similarly internally cup-shaped recessed end providing an annular end flange movable into and substantially filling said space during compression strokes of the piston, a suction valve confined within said gap, an annular discharge valve communicable with said bore through said space, and conduit means formed to connect said gap with the cylinder interior through said piston flange whenever the piston approaches the end of a compression stroke.

4. In a compressor, a cylinder having a bore and an end closure head provided with a portion projecting into and cooperating with the cylinder to form an annular space projecting away from the bore and also having an annular gap extending outwardly away from said space, a piston reciprocable within said bore and having a cup-shaped end recess surrounded by an annular flange movable into and substantially filling said space and sealing said gap from the cylinder interior during compression strokes of said piston, a suction valve confined within said gap, an annular discharge valve coacting with said head at the end of said space farthest from the cylinder interior, and restricted conduit means extending through said piston flange and being operable to connect said gap with the cylinder interior whenever the piston flange enters said space.

5. In a gas compressor, a cylinder having a bore and an end closure head cooperating with the cylinder to form an annular space projecting axially away from the cylinder interior and also having an annular gap extending outwardly away from said bore and space, a piston reciprocable within said bore and having a recessed end forming an annular end flange movable into and substantially filling said space during compression strokes of the piston, an annular suction valve confined within said gap, an annular discharge valve coacting with said head adjoining said space, and restricted conduit means extending through said flange and connecting said gap with the cylinder interior whenever the piston flange enters said space.

6. In a compressor, a cylinder having a bore and an end closure head provided with a projection cooperating with the cylinder to form an annular gas discharge space projecting coaxially away from the bore and also having an annular gas inlet gap extending outwardly away from said space, a piston reciprocable within said bore and having a cup-shaped end provided with an annular flange movable into and substantially filling said space and sealing said gap during compression strokes of said piston, an annular spring loaded inlet valve confined within said gap, an annular spring loaded discharge valve carried by said end head at the outer end of said space, and restricted liquid escape conduit means formed in said piston flange and being operable to connect said gap with the cylinder interior whenever the piston completes a compression stroke.

References Cited in the file of this patent

UNITED STATES PATENTS

| | | |
|---|---|---|
| 1,489,912 | Winkler | Apr. 8, 1924 |
| 1,607,658 | Whitehead | Nov. 23, 1926 |
| 1,901,817 | Neidl | Mar. 14, 1933 |
| 1,972,750 | Aikman | Sept. 4, 1934 |
| 2,074,323 | Borgerd | Mar. 23, 1937 |
| 2,334,939 | Larson | Nov. 23, 1943 |